(12) United States Patent
Kurth et al.

(10) Patent No.: US 11,713,408 B2
(45) Date of Patent: *Aug. 1, 2023

(54) LECITHIN DRYING USING FATTY ACIDS

(71) Applicant: CARGILL, INCORPORATED, Wayzata, MN (US)

(72) Inventors: Todd L. Kurth, Maple Grove, MN (US); Suzanne Stauduhar, Robbinsdale, MN (US); Andrew Karl, Maple Grove, MN (US)

(73) Assignee: CARGILL, INCORPORATED, Wayzata, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/804,894

(22) Filed: Jun. 1, 2022

(65) Prior Publication Data
US 2022/0290029 A1 Sep. 15, 2022

Related U.S. Application Data

(63) Continuation of application No. 15/515,330, filed as application No. PCT/US2015/052932 on Sep. 29, 2015, now Pat. No. 11,352,537.

(60) Provisional application No. 62/084,612, filed on Nov. 26, 2014, provisional application No. 62/056,954, filed on Sep. 29, 2014.

(51) Int. Cl.
| | | |
|---|---|---|
| C08L 95/00 | (2006.01) | |
| C09K 8/035 | (2006.01) | |
| C11C 1/00 | (2006.01) | |
| C11B 7/00 | (2006.01) | |
| C09K 8/528 | (2006.01) | |
| C11B 15/00 | (2006.01) | |
| A23D 9/02 | (2006.01) | |
| A23D 9/013 | (2006.01) | |
| C07F 9/10 | (2006.01) | |

(52) U.S. Cl.
CPC .............. *C09K 8/035* (2013.01); *A23D 9/013* (2013.01); *A23D 9/02* (2013.01); *C07F 9/103* (2013.01); *C08L 95/00* (2013.01); *C09K 8/528* (2013.01); *C11B 7/00* (2013.01); *C11B 15/00* (2013.01); *C11C 1/002* (2013.01); *C11C 1/005* (2013.01); *C08L 2555/34* (2013.01); *C08L 2555/60* (2013.01); *C09K 2208/32* (2013.01); *Y02A 30/30* (2018.01)

(58) Field of Classification Search
CPC ....................................................... C08L 95/00
See application file for complete search history.

(56) References Cited

U.S. PATENT DOCUMENTS

| | | | |
|---|---|---|---|
| 2,020,662 A | 11/1935 | Schwieger | |
| 2,150,732 A | 3/1939 | Thurman | |
| 2,383,097 A | 8/1945 | Weetman | |
| 2,508,431 A | 5/1950 | Smith | |
| 2,574,930 A | 11/1951 | Mitchell | |
| 2,592,564 A | 4/1952 | Hardman | |
| 2,673,813 A | 3/1954 | Feller | |
| 2,793,996 A | 5/1957 | Lummus | |
| 2,901,369 A | 8/1959 | Pordes | |
| 3,340,203 A * | 9/1967 | Ferm | C08K 5/521 |
| | | | 516/43 |
| 3,357,918 A | 12/1967 | Davis | |
| 4,200,551 A | 4/1980 | Orthoefer | |
| 5,120,357 A | 6/1992 | Eichberg | |
| 5,131,225 A | 7/1992 | Roettger | |
| 5,164,002 A | 11/1992 | Ballenger, Jr. | |
| 5,744,524 A | 4/1998 | Manandhar | |
| 5,820,663 A | 10/1998 | Miller | |
| 5,928,418 A * | 7/1999 | Tamaki | C08L 95/005 |
| | | | 427/249.7 |
| 6,440,478 B1 | 8/2002 | Benton | |
| 6,713,522 B2 | 3/2004 | Zhang | |
| 6,822,012 B1 | 11/2004 | Baumgart | |
| 7,951,862 B2 | 5/2011 | Bloom | |
| 8,232,418 B1 | 7/2012 | Bilbie | |
| 9,644,173 B2 | 5/2017 | Reinke | |
| 2002/0077377 A1 | 6/2002 | Zhang | |

(Continued)

FOREIGN PATENT DOCUMENTS

| | | | |
|---|---|---|---|
| CA | 2163815 A1 | 5/1996 | |
| CA | 2315955 A1 | 2/2002 | |

(Continued)

OTHER PUBLICATIONS

Erickson "Degumming and Lecithin Processing and Utilization, Processing and Utilization", Practical Handbook of Soybean Processing and Utilization. pp. 174-183. http://doi.org/10.1016/B978-0-935315-63-9.50014-0 (Year: 1995).*

(Continued)

*Primary Examiner* — Alexandra M Moore

(57) ABSTRACT

Aspects of the present invention provide methods of drying lecithin in a batch reaction, comprising the steps of obtaining a lecithin-containing material (derived from a crude refining stream) comprising 15-50% water, 10-30% acetone insoluble matter, and 10-20% free fatty acid; adding a fatty acid source (also derived from a crude refining stream) to the lecithin-containing material composition to obtain a lecithin/fatty acid reaction mixture; and blowing dry gas through the gum/fatty acid reaction mixture to obtain a resultant dried lecithin fatty acid blend having a water content of less than 2%. The resultant dried lecithin fatty acid blend may be used in asphalt or oil field applications.

7 Claims, No Drawings

(56) References Cited

U.S. PATENT DOCUMENTS

| | | |
|---|---|---|
| 2004/0111955 A1 | 6/2004 | Mullay |
| 2004/0161520 A1 | 8/2004 | Maynes |
| 2005/0027024 A1 | 2/2005 | Zhang |
| 2007/0161812 A1 | 7/2007 | Lemonds |
| 2008/0314294 A1 | 12/2008 | White |
| 2010/0261805 A1 | 10/2010 | Abraham |
| 2013/0102694 A1 | 4/2013 | Keaton |
| 2014/0066347 A1 | 3/2014 | Baseeth |
| 2014/0275593 A1 | 9/2014 | Hora |
| 2014/0338565 A1 | 11/2014 | Severance |

FOREIGN PATENT DOCUMENTS

| | | |
|---|---|---|
| CN | 102532925 A | 7/2012 |
| GB | 382432 A | 10/1932 |
| GB | 2462371 A | 2/2010 |
| JP | 4939612 A | 4/1974 |
| WO | 2014129758 A1 | 8/2014 |
| WO | 20160540351 | 4/2016 |
| WO | 2016187415 A1 | 11/2016 |

OTHER PUBLICATIONS

"Lecithin", Internet Citation, Jan. 1, 2014 (Jan. 1, 2014), pp. I-1, XP003035477, URL:http://en.wikipedia.org/wiki/Lecithin.

Adhikar S et al: "Indian Ricebran Lecithin", Journal of the American Oil Chemists Society, vol. 63, No. 10, Oct. 1, 1986 (Oct. 1, 1986), pp. 1367-1367, XP055847183, DE, ISSN: 0003-021 X, DOI: 10.1007/BF02679604.

Alemdar, "Production of oil-based binder by RAFT polymerization technique", Progress in Organic Coatings, Dec. 2010, 522-526.

Anonymous, "Polyphosphoric Acid Modification of Asphalt Binders, E-C160", Transportation Research Circular Jan. 2012, Apr. 8, 2009 (Apr. 8, 2009), pp. 1-172, XP055066169, Retrieved from the Internet: URL: www.tbr.org.

Anonymous: "Soybean oil—Wikipedia", Nov. 13, 2018 (Nov. 13, 2018), pp. 1-4, XP055523288, Retrieved from the Internet: URL:https://en.wikipedia.org/wiki/Soybean_oil.

Aquilina Gabriele et al: "Safety and efficacy of lecithins for all animal species", The EFSA Journal, vol. 14, No. 8, Aug. 1, 2016 (Aug. 1, 2016), p. 4561, XP055846897, Parma, IT, ISSN: 1831-4732, DOI: 10.2903/j.efsa.2016.4561, Retrieved from the Internet: URL:https://efsa.onlinelibrary.wiley.com/doi/pdfdirect/10.2903/j.efsa.2016.4561.

C. R. Scholfield: "Composition of soybean lecithin", Journal of the American Oil Chemists' Society (JAOCS), vol. 58, No. 10, Oct. 1, 1981 (Oct. 1, 1981), pp. 889-892, XP055463512, DE, ISSN: 0003-021X, DOI:10.1007/BF02659652.

Daicheng Liu et al: "22 Soybean Phospholipids", Oct. 28, 2011 (Oct. 28, 2011), pp. 483-501, XP055208001, Retrieved from the Internet: URL:http://cdn.intechopen.com/pdfs-wm/22616.pdf.

Emmanuel Nyankson et al: "Soybean Lecithin as a Dispersant for Crude Oil Spills", ACS Sustainable Chemistry & Engineering, vol. 3, No. 5, Apr. 7, 2015 (Apr. 7, 2015), pp. 920-931, XP055493682, US ISSN: 2168-0485, DOI: 10.1021/acssuschemeng.5b00027.

Erickson "Degumming and Lecithin Processing and Utilization", Practical Handbook of Soybean Processing and Utilization. pp. 174-183. https://doi.org/10.1016/B978-0-935315-63-9.50014-0 (Year: 1995).

Fiume Z: "Final report on the safety assessment of Lecithin and Hydrogenated Lecithin", International Journal of Toxicology, Sage Publications, Inc, US, vol. 20, No. Su PPL 1, Jan. 1, 2001 (Jan. 1, 2001), pp. 21-45, XP0081 02244, ISSN: 1091-5818, DOI: 10.1080/109158101750300937.

Godoy C A et al: "Effect of fatty acids on self-assembly of soybean lecithin systems", Colloids and Surfaces B: Biointerfaces, Elsevier Amsterdam, NL, vol. 131, Apr. 21, 2015 (Apr. 21, 2015), pp. 21-28, XP029179055, ISSN: 0927-7765, DOI: 10.1016/J.COLSURFB.2015.03.065.

Gunawan Setiyo et al: "Vegetable Oil Deodorizer Distillate: Characterization, Utilization and Analysis", Separation and Purification Reviews, vol. 38, No. 3, Jul. 1, 2009 (Jul. 1, 2009), pp. 207-241, XP055775963, US, ISSN: 1542-2119, DOI: 10.1080/15422110903095151.

Hutt, Weatherall, and Culshaw "The Determination of Total Phosphatide in Commercial Lecithin". Analyst, 1953, 78, 712-716. https://doi.org/10.1039/AN9537800712 (Year: 1953).

Lemuel M. Diamante et al: "Absolute Viscosities of Vegetable Oils at Different Temperatures and Shear Rate Range of 64.5 to 4835s-1", Journal of Food Processing, vol. 2014, Jan. 1, 2014 (Jan. 1, 2014), pp. 1-6, XP055364893, ISSN: 2356-7384, DOI: 10.1155/2014/234583.

M. Chappat: "Some applications of emulsions", Colloids and Surfaces A: Physiochemical and Engineering Aspects, vol. 91, Nov. 1, 1994 (Nov. 1, 1994), pp. 57-77, XP055526104, Amsterdam, NL, ISSN: 0927-7757,DOI:10.1016/0927-7757(94)02976-8.

Nichireki Chem Ind Co Ltd, "English Abstract of JP49039612A", Apr. 13, 1974, 1 page.

Noureddini Hossein et al: "Viscosities of vegetable oils and fatty acids Viscosities of Vegetable Oils and Fatty Acids", Papers in Biomaterials 10, Dec. 1, 1992 (Dec. 1, 1992), XP055776000, Retrieved from the Internet: URL:https://digitalcommons.unl.edu/cgi/viewcontent.cgi?article=1012&context=chemeng_biomaterials.

Peter Van Hoogevest et al: "The use of natural and synthetic phospholipids as pharmaceutical excipients : The use of natural and synthetic phospholipids", European Journal of Lipid Science Technology, vol. 116, No. 9, Aug. 25, 2014 (Aug. 25, 2014), pp. 1088-1107, XP0553714 77, DE, ISSN: 1438-7697, DOI: 10.1002/ejlt.201400219.

Szuhaj, B. F., "Lecithin Production and Utilization", JAOCS vol. 60, No. 2 (Feb. 1983), https://link.springer.com/content/pdf/10.1007%2FBF02543508.pdf (Year: 1983).

Verleyen T et al: "Gas chromatographic characterization of begetable oil deodorization distillate", Journal of Chromatography A, Elsevier, Amsterdam, NL, vol. 921, No. 2, Jul. 6, 2001 (Jul. 6, 2001), pp. 277-285, NP004246405, ISSN: 0021-9673, DOI: 10.1016/50021-9673(01)00881-0.

W Y: "Fractionation of crude soybean lecithin with aqueous ethanol", Journal of the American Oil Chemists' Society, vol. 81, No. 7, Jan. 1, 2004 ((Jan. 1, 2004), pp. 697-704, XP055044623.

Y. El-Shattory et al: "Soybean lecithin: acetone insoluble residue fractionation and their volatile components", Grasas Y Aceites, vol. 53, No. 3, Sep. 30, 2002 (Sep. 30, 2002), pp. 319-323, XP055525721, Spain, ISSN: 0017-3495.

Yan S et al: "Oil transesterification over calcium oxides modified with lanthanum", Applied Catalysis A: General, Elsevier, Amsterdam, NL, vol. 360, No. 2, Jun. 1, 2009 (Jun. 1, 2009), pp. 163-170, XP026089927, ISSN: 0926-860X, DOI:10.1016/J.APCATA.2009.03.015.

* cited by examiner

LECITHIN DRYING USING FATTY ACIDS

CROSS REFERENCE TO RELATED APPLICATION

This application is a Continuation of U.S. patent application Ser. No. 15/515,330, filed Mar. 29, 2017, which is a national phase of International Patent Application No. PCT/US2015/052932, filed Sep. 29, 2015, which claims the benefit of U.S. Provisional Patent Application No. 62/056,954, filed Sep. 29, 2014, and U.S. Provisional Patent Application No. 62/084,612, filed Nov. 26, 2014, each of which are hereby incorporated by reference in their entirety.

TECHNICAL FIELD

This disclosure relates to the drying of lecithin using fatty acids.

BACKGROUND

There is a desire amongst asphalt companies to have an aggregate that, when applied to roads, quickly binds with an asphalt binder containing composition to provide adequate curing thus enabling drivers to get back to driving on the roads as fast as possible and supporting the longevity of the road. Sometimes, however, the moisture content and substrate composition (among other things) in the aggregate may interfere with binding which, consequently, delays the curing of a road. There are two primary ways to mitigate this problem: (1) dry the aggregate before applying the binder, which can be costly, or more preferably (2) utilize an anti-stripping agent that minimizes the negative effect of the moisture on the surface of the aggregate and promotes adhesion to the binder. Many anti-stripping agents are amine-based which have corrosive properties. Thus, developing anti-stripping agents that do not have such corrosive properties is desirable.

BRIEF SUMMARY

Aspects of the present invention provide methods for producing a dry lecithin fatty acid blend, comprising: obtaining a lecithin-containing material, derived from a crude plant-based oil refining stream, comprising 15-50 wt % water, 10-30 wt % acetone insoluble matter, and 10-20 wt % free fatty acid; adding a fatty acid source to the lecithin-containing material to obtain a reaction mixture; and blowing a dry gas through the reaction mixture to obtain a lecithin fatty acid blend comprising less than 1 wt % water, 20-40 wt % acetone insoluble matter, and 35-48 wt % fatty acid.

Aspects of the present invention provide methods for producing a dry lecithin fatty acid blend, comprising: obtaining a lecithin-containing material derived from a crude plant-based oil refining stream; adding a fatty acid source to the lecithin-containing material to obtain a reaction mixture; heating the reaction mixture to a temperature ranging from 90-130° C. to obtain a lecithin fatty acid blend.

Aspects of the present invention provide lecithin fatty acid blend/asphalt binder mixture compositions for asphalt applications, comprising: 0.25-3 wt % lecithin fatty acid blend comprising less than 2 wt % water, 20-40 wt % acetone insoluble matter, and 35-48 wt % fatty acid; and 97-99.75 wt % asphalt binder.

Aspects of the present invention provide methods of incorporating fatty acid lecithin blends in asphalt applications, comprising: obtaining a lecithin fatty acid blend, comprising less than 2 wt % water, between 20 and 40 wt % acetone insoluble matter, and between 35 and 48 wt % fatty acid; and adding the lecithin fatty acid blend to an asphalt binder; wherein the amount of the lecithin fatty acid blend ranges from 0.25 to 3 wt % of the lecithin fatty acid blend/asphalt binder mixture.

For the purpose of this invention asphalt binder is the bituminous material that together with the lecithin fatty acid blend comprise the binder phase of an asphalt. Asphalt can be utilized in road paving (i.e. asphalt pavement, in roofing applications, and other end-use applications known to one of skill in the art. Asphalt refers to a blend of lecithin fatty acid/asphalt binder blend combined with other material such as aggregate or filler to make the asphalt. The asphalt binder used in this invention may be material acquired from bituminous material producing refineries, flux, refinery vacuum tower bottoms, pitch, and other residues of processing of vacuum tower bottoms. In another preferred aspect, the asphalt binder is obtained from reclaimed asphalt pavement and/or recycled asphalt shingles.

Aspects of the present invention provide methods of incorporating fatty acid lecithin blends in asphalt applications, comprising: obtaining a lecithin fatty acid blend, comprising less than 2 wt % h water, between 5 and 75 wt % acetone insoluble matter, and between 25 and 95 wt % fatty acid; and adding the lecithin fatty acid blend to aggregates to be used in asphalt pavements, wherein the amount of the lecithin fatty acid blend ranges from 0.25 to 3 wt % of the lecithin fatty acid blend/aggregate mixture.

Aspects of the present invention provide methods of incorporated fatty acid lecithin blends in asphalt applications, comprising: obtaining a lecithin fatty acid blend, comprising less than 2 wt % water, between 5 and 75 wt % acetone insoluble matter, and between 25 and 95 wt % fatty acid; and adding the lecithin fatty acid blend to treat reclaimed asphalt pavement millings (RAP) to be reused in asphalt pavements thereby obtaining a total mixture, wherein the amount of the lecithin fatty acid blend ranges from 0.25 to 3 wt % of the total mixture.

DETAILED DESCRIPTION

"Acetone Insoluble Matter" (AI) determines the acetone insoluble matter in a sample and is reported as % per AOCS method Ja 4-46 (2011). The phosphatides are included in the acetone-insoluble fraction.

"Acid Value" (AV) is a measure of the residual acid groups present in a compound and is reported in units of mg KOH/gram material. The acid number is measured according to the method of AOCS method Ja 6-55 (2011).

"Gums" utilized herein are derived from plant-based materials, preferably corn, soy, canola (rapeseed), and cottonseed and are comprised of water, acetone insoluble matter (mostly phosphatides), free fatty acids, and oil.

"Lecithin" is a complex mixture of acetone-insoluble phosphatides combined with various amounts of other substances, such as triglycerides, fatty acids, and carbohydrates. Lecithin contains at least 50% of acetone insoluble matter.

"Phosphatides" include phosphatidic acid, phosphatidylinositol, phosphatidylethalnolamine, phosphatidylcholine, and other phospholipids.

"Reaction" utilized herein primarily refers to the physical reaction of drying and the blending of lecithin-containing material and a fatty acid source.

Lecithin-Containing Material

The lecithin-containing material utilized herein is preferably derived from crude refining streams (from the processing of crude plant-based oils) containing fatty acids and phosphatidyl material. In some aspects, the lecithin-containing material may be gums resulting from a degumming processes carried out on crude plant-based oils, for example, but not limited to, water degumming, caustic and acidic degumming, phospholipase A and phospholipase C degumming, or other enzymatically produced gums. In other aspects, the lecithin-containing material may come from other oils or other crude triacylglyceride (i.e. oil) refining streams containing fatty acids and/or phosphatide material (e.g., soapstock, acidulated soapstock, etc.). In yet other aspects, the lecithin-containing material may come from animal sources, such as egg yolks and various animal sources.

It shall be understood that despite the various aspects, the lecithin-containing material preferably comes from crude products rather than food-grade products. Thus, crude products that are dark in color, odorous, or otherwise undesirable for food and personal care applications are preferred sources for the lecithin-containing material (however, food-grade lecithin may also be used as the lecithin-containing material).

Regardless of the source, the lecithin-containing material comprises water, phosphatides (typically defined by acetone insoluble matter), free fatty acids, and oil. In preferred aspects, the lecithin-containing material comprises between 15 wt % and 50 wt % water (more preferably between 20-40 wt % water), between 10 wt % and 30 wt % acetone insoluble matter (mostly phosphatides), between 10 wt % and 20 wt % free fatty acids, with the remaining balance being oil (i.e. primarily triacylglycerides with some diacylglycerides and monoacylglycerides). Note that moisture (water) content is determined using AOCS method Ja 2b-87 (2009) and acetone insoluble matter is determined using AOCS method Ja 4-46 (2011).

Fatty Acid Source

A fatty acid source is added to the lecithin-containing material. The fatty acid source serves as a mixing and heat transfer aid for the lecithin-containing material and also helps reduce the viscosity of the lecithin-containing material.

Many types of fatty acid sources may be used. For cost effective reasons, crude waste streams, for example deodorized distillate streams, vegetable oils, and recovered corn oil streams (and derivatives thereof, for example, polymerized corn oil streams), are desirable fatty acid sources. Typically, the fatty acid source is comprised of at least 10% by weight free fatty acid, for example, at least 50% by weight free fatty acid, and preferably at least 85% by weight free fatty acid.

One skilled in the art will appreciate that gums are highly viscous compositions resulting from complex structures at the oil/water interface. Accordingly, it is difficult to simply heat gums to remove water content without causing undesirable foaming and decomposition of the lecithin contained in the gums. Thus, the fatty acid source should provide both a heat transfer and fluidizing effect via the breaking down of physical structures at the oil/water interface. Together these provide for efficient release of water (decreased foaming) and lower required temperatures with reduced cycle times.

In preferred aspects, the fatty acid source has a viscosity ranging from 20 to 400 cSt at 25° C., and more preferably 30 to 200 cSt at 25° C. In further preferred aspects, the fatty acid source may be Cargill's Agri-Pure™ (AP) or Agri-Pure™ Gold (APG) vegetable based products: AP 138 (deodorized distillate; solid at 25° C.; 20 cSt at 40° C.), APG 45 (recovered corn oil; 40 cSt at 25° C.), or APG 55 (modified recovered corn oil; 135 cSt at 25° C.). Without being bound by any theory, it is believed that the fatty carboxylic acid contained in the APG products (i.e. the free fatty acids) aids in the lecithin drying process.

The Reaction Mixture

In the embodiments described herein, the fatty acid source is first heated in a reactor to a temperature ranging from 90-130° C. In preferred aspects, the fatty oil source is heated to a temperature ranging from 100-120° C., and more preferably around 110° C. The lecithin-containing material is added to the reactor housing the heated fatty acid source. Without being bound by any theory, it is believed that this temperature range not only facilitates the drying of lecithin but also beneficial darkening of color.

The lecithin-containing material is added to the fatty acid source such that the ratio of fatty acid source to lecithin-containing material ranges from about 5:95 to 30:70. In a first preferred aspect, the weight ratio of fatty acid source to lecithin-containing material ratio is about 10:90 (for example, when recovered corn oil or acid oil is used as the fatty acid source). In a second preferred aspect, the weight ratio of fatty acid source to lecithin-containing material ratio is from about 15:85 to about 28:72 (for example, about 25:75) (for example, when deodorized distillate is used as the fatty acid source). It shall be understood that the weight ratio of fatty acid source to lecithin-containing material may vary based on the desired results for the industrial application.

Optionally, a nominal amount of anti-foam agent may be added to the mixture as well. If an anti-foaming agent is added, it typically makes up less than 0.1 wt % of the reaction mixture.

Gums are typically very viscous and difficult to handle, specifically below room temperature. Thus, an objective of the present invention is to maintain the reaction mixture (fatty acid source/lecithin-containing material) at the elevated temperatures described above and to continuously stir the reaction mixture to maintain its stability.

Drying the Reaction Mixture

Dry gas, for example, carbon dioxide, nitrogen, oxygen, air, or a combination of any of these is passed through the reaction mixture to facilitate in the removal of the water content in the gums. Typically, this is carried out by blowing the dry gas through the reaction mixture. Typically, nitrogen or air is blown through the reaction mixture at a pressure ranging between 0 psig and 1 psig and at a rate ranging between 5 cubic feet per minute (cfm) and 200 cubic feet per minute. In some preferred embodiments, the blowing rate is between 125 and 175 cfm. Reduced pressures (e.g., vacuum conditions) may be employed but may not be preferred due to increased cost and increased foam formation.

Dry gas is continuously blown through the reaction mixture until the water content is reduced to the desired level. In preferred aspects, the water content is reduced to less than 1 wt %.

This overall reaction may be carried out as a batch process or a semi-continuous process.

Typically, the reaction lasts between 6 and 20 hours to reduce the water content to desired levels. A critical parameter in determining reaction time is the ability to transfer heat throughout the system (which, as stated above, is facilitated by the fatty acid source). It shall be understood that the removal of water and the dry gas sparge causes cooling in the reactor, so the ability to maintain and transfer heat throughout the system is an objective of the present invention.

Resulting Product

Upon completion of the reaction, the resulting product is a lecithin fatty acid blend with a majority of the water content removed, as described above. Accordingly, the lecithin fatty acid blend may comprise less than 2 wt % of water, and more preferably less than 1 wt % water, and more preferably less than 0.9 wt % water, and more preferably less than 0.5 wt % water, and even more preferably less than 0.3 wt % water. Water content is measured according to the AOCS method Ja 2b-87 (2009). Further, the lecithin fatty acid blend may comprises between 5 and 75% acetone insoluble matter, and more preferably 20 to 40 wt % acetone insoluble matter, and even more preferably around 33 wt % acetone insoluble matter as measured by the AOCS method Ja 4-46 (2011). Additionally, the lecithin fatty acid blend may comprise between 25 and 95 wt % fatty acid, and more preferably between 35 and 48 wt % fatty acid (contributed from both the lecithin material and the fatty acid source) as measured by the AOCS method Ja 6-55 (2011). Any remaining balance of the lecithin fatty acid blend may comprise oil and other natural impurities.

In desired aspects, the lecithin fatty acid blend has a final viscosity of 200-3000 cSt at 25° C. as measured by AOCS method Ja 10-87 method (note that this method is used for all viscosity values defined herein). In preferred aspects, the viscosity of the lecithin fatty acid blend ranges from 300-800 cSt at 25° C. Further, the lecithin fatty acid blend is typically a fluid, albeit viscous, particularly below room temperature, typically having pour points below 0° C., and more typically a pour point of around −20° C.

The color of the lecithin fatty acid blend is typically a dark brown. Although the Gardner test may be used to determine color, many of the lecithin fatty acid blends will surpass the scale of the test. Because the lecithin fatty acid blend is typically used in asphalt and oilfield applications, color typically is not a main consideration factor.

The resulting lecithin fatty acid blend may be used as an anti-stripping agent in asphalt applications. It is surprising that this crude lecithin fatty acid blend, having a lower acetone insoluble matter than that of food grade lecithin material, performs better than food grade lecithin material as an anti-stripping agent.

Without being bound to any theory, it is believed that the fatty acid and phosphotidyl material in the lecithin fatty acid blend synergistically interacts with moisture, and/or calcium, or other metal content of the rock aggregate which consequently enhances adhesion between the binder (i.e. bituminous material) and the aggregate.

In the embodiments of the present invention, the lecithin fatty acid blend described herein is thoroughly mixed with an asphalt binder. The lecithin fatty acid blend/asphalt binder mixture is mixed until a homogenous product is reached (typically, the mixture may be heated between 70-140° C. and agitated to facilitate a homogenous blend). In preferred aspects, the mixture comprises 0.25-3 wt % of the lecithin fatty acid blend with the balance being asphalt binder. The resultant processed lecithin fatty acid blend/asphalt binder mixture is then typically mixed at approximately 2 wt % to 7 wt % (for example, about 5% by weight) use level with an aggregate substrate, or according to the mix design called for by the road manufacturer.

In other embodiments, the lecithin fatty acid blend described herein is thoroughly mixed with an asphalt binder and may comprise from 0.25 to 3 wt % of the total blend. Yet in other embodiments, the lecithin fatty acid blend may be used to treat reclaimed asphalt pavement millings (RAP) to be reused in asphalt pavements, and the lecithin fatty acid blend may comprise from 0.25 to 3 wt % of the total lecithin fatty acid blend/asphalt binder mixture.

Aggregate/binder mixes containing the lecithin fatty acid blend described herein were tested by the National Center of Asphalt Technology at Auburn University. The test results were favorable in that the aggregate/binder mix improved the tensile strength ratio (TSR) moisture susceptibility above the American Association of State Highway and Transportation Officials (AASHTO) recommended failure threshold of 0.8 (determined using the AASHTO T283 method).

Lecithin is may be used as a reagent in the manufacture of organophilic clays and as a beneficial additive to invert drilling mud formulation in which these clays are utilized. Further, in these invert mud formulations fatty acids may be used as primary emulsifiers. Having desirable viscosity and low temperature properties, the lecithin fatty acid blend of this invention therefore is particularly suited for use as a reagent and beneficial additive for organophilic clay manufacture or in the modification of invert mud formulations.

It is believed that this lecithin fatty acid blend may also be used as a surfactant, de-dust aid, or an emulsifying agent in oil field (e.g., drilling and corrosion inhibition) and mining applications. Even more generally, this lecithin fatty acid blend may be used in applications involving interfacial interactions with monovalent and divalent metal containing substrates (e.g., calcium-containing substrates).

It is further believed that this lecithin fatty acid blend may be used as a compaction aid additive (as further discussed below). In recent years an increasing portion of pavements are produced using what is commonly referred to as "compaction aid additives" to produce "warm mix" asphalt pavements. Warm mix pavements can be produced and compacted at lower production temperatures, require less compaction effort to achieve target mixture density, and as a result can retain the properties necessary for compaction at lower temperature enabling an increase in the maximum haul distance of the asphalt mixture from the plant to the job site.

The different mechanisms through which compaction aid additives may be beneficial, include but are not limited to, increased lubrication of aggregates during asphalt mixture compaction, reduction of the binder viscosity at production temperatures, and better coating and wettability of the aggregates. Thus a diverse range of chemicals and additives may exhibit one or more of the properties attributed to compaction aid additives when added to an asphalt/bitumen mixture.

The lecithin fatty acid blend described herein can be used as a compaction aid additive to be mixed with asphalt/bitumen, thereby creating a warm mix composition, which may be subsequently added to an aggregate material to produce a warm mix asphalt pavement. Such a compaction aid additive achieves a number of the benefits including at a minimum decreasing production and construction temperatures through increase in aggregate lubrication and aggregate wettability. In such an application the additive would be used at dosages preferably in the range of between about 0.05 and 10% by weight of the asphalt binder.

It shall also be understood that the compaction aid additive can include components in addition to the lecithin fatty acid blend, such as surfactants and other high melting point solids such as waxes, plasticizers, and other components known by those skilled in the art as useful for the manufacture of warm mix asphalt pavement.

EXAMPLES

The following examples are presented to illustrate the present invention and to assist one of ordinary skill in making and using same. The examples are not intended in any way to otherwise limit the scope of the invention.

Example 1: Producing the Lecithin Fatty Acid Blend

Begin charging reactor with about 9200 pounds of hot AP-138 (Cargill manufactured fatty acid source containing 92 wt % free fatty acid) at a temperature of around 100° F. The acid value of the AP-138 is 190-200 mg KOH/g. Introduce nitrogen sparge to the reactor at a rate of 10 cubic feet per minute (cfm). Gradually increase the temperature of the reactor to achieve a temperature of 110° C. Begin charging the reactor with 46,400 pounds of warm corn gums having an acid value of 23 mg KOH/g and 35 wt % water content and subsequently increase the nitrogen sparge to a rate of 30 cfm. A nominal amount of anti-foam (TEGO Antifoam MR1015) is also added to the reactor.

Once all components are added to the reactor, the temperature is increased to 120° C. and air flow is introduced to the reactor at a rate of at least 150 cfm with a pressure of around 1.15 psig. The reaction runs for about 17 hours, therefore reducing the water content to around 0.65 wt %.

Example 2: Producing the Lecithin Fatty Acid Blend

The batch reactor is charged with AP-138 (Cargill manufactured fatty acid source containing 92 wt % fatty acid) and heated to a temperature of 110° C. Wet corn gums containing 38 wt % water and TEGO Antifoam MR1015 are gradually added to the batch reactor and the temperature is gradually increased to 140° C. The composition of the reaction mixture is provided in

TABLE 1

| Component | Wt % | Wt (kg) |
|---|---|---|
| AP-138 (92% FA) | 21.01 | 47.10 |
| Wet Corn Gums | 78.89 | 176.90 |
| TEGO Anitfoam MR 1015 | 0.10 | 0.23 |

An air sparge is introduced into the batch reactor and blown until the water content is reduced to 0.2 wt %.

Table 2 details the composition of the final lecithin-fatty acid blend derived from drying the wet corn gums blend described in Table 1. Table 3 details the properties of the lecithin fatty acid blend product described in Table 2.

TABLE 2

| Component | Rxn Wt % | Rxn Wt (kg) |
|---|---|---|
| AP-138 (92% FA) | 30.00 | 47.10 |
| Lecithin | 69.85 | 109.66 |
| TEGO Anitfoam MR 1015 | 0.15 | 0.23 |

TABLE 3

| Properties of Resultant Product | |
|---|---|
| Acid Value (AOCS method Ja 6-55) | 92.3 mg KOH/g |
| Acetone Insoluble Matter (AOCS method Ja4-46) | 33.3 wt % |
| Viscosity | 1575 cSt at 25° C. |
| Water content | 0.2 wt % |
| Solids | 99.1 wt % |

Example 3: Testing the Performance of the Lecithin Fatty Acid Blend in Asphalt Applications Testing the performance of the lecithin and fatty acid blend in asphalt applications may be carried out via several methods—such as the boil method (ASTM D 3625-12), the bottle rolling test, the Tensile Recovery Test (AASHTO T283-14 and/or the Homburg Wheel Tracking Test. A purpose of these tests is to observe how well the binder binds to the rock aggregate. Using the boil method described above, once the samples have been boiled in water for 10 minutes, the coated aggregate is removed and observations regarding how much asphalt binder has been stripped from the rock are made.

We claim:

1. A method of incorporating fatty acid lecithin blends in asphalt applications, comprising:
   (a) obtaining a lecithin fatty acid blend, comprising:
      i. less than 2 wt % water;
      ii. between 5 and 75 wt % acetone insoluble matter; and
      iii. between 25 and 95 wt % free fatty acid; and
   (b) adding the lecithin fatty acid blend to aggregates to be used in asphalt pavements, wherein the amount of the lecithin fatty acid blend ranges from 0.25 to 3 wt % of the lecithin fatty acid blend/aggregate mixture.

2. The method of claim 1, further comprising adding reclaimed asphalt pavement millings prior to or after step (b).

3. The method of claim 1, wherein:
   the lecithin fatty acid blend of (a) comprises:
   -between 20 and 40 wt % acetone insoluble matter; and
   -between 35 and 48 wt % free fatty acid.

4. A method of incorporating fatty acid lecithin blends in asphalt applications, comprising:
   a. obtaining a lecithin fatty acid blend, comprising:
      i. less than 2 wt % water;
      ii. between 5 and 75 wt % acetone insoluble matter; and
      iii. between 25 and 95 wt % free fatty acid; and
   b. adding the lecithin fatty acid blend to an asphalt binder; wherein the amount of the lecithin fatty acid blend ranges from 0.05 to 10 wt % of the lecithin fatty acid blend/asphalt binder mixture.

5. The method of claim 4, wherein the lecithin fatty acid blend acts as a compaction aid additive.

6. The method of claim 4, wherein the lecithin fatty acid blend of (a) comprises between 35 and 48 wt % free fatty acid.

7. The method of claim 6, wherein the lecithin fatty acid blend of (a) comprises between 20 and 40 wt % acetone insoluble matter.

* * * * *